United States Patent [19]

Dawson

[11] Patent Number: 5,074,703

[45] Date of Patent: Dec. 24, 1991

[54] LOCKING MECHANISMS

[76] Inventor: Peter G. Dawson, 51 Baileys Close, Blackwater, England

[21] Appl. No.: 592,300

[22] Filed: Oct. 2, 1990

[30] Foreign Application Priority Data

Oct. 17, 1989 [GB] United Kingdom ............ 8923325

[51] Int. Cl.$^5$ .................... F16B 7/18; F16D 1/00
[52] U.S. Cl. .................. 403/342; 403/320; 192/56 R
[58] Field of Search .......... 192/56 R, 46; 403/320, 403/342

[56] References Cited

U.S. PATENT DOCUMENTS

| 903,435 | 11/1908 | Barrott | 403/320 |
| 915,735 | 3/1909 | Brown | 403/320 |
| 1,677,199 | 7/1928 | Nelson | 403/320 |
| 1,796,506 | 3/1931 | Conner | 403/320 |
| 4,582,444 | 4/1986 | Miskinis | 403/342 |
| 4,642,837 | 2/1987 | Nichols et al. | 403/342 |

FOREIGN PATENT DOCUMENTS

| 0019038 | 3/1930 | Australia | 403/342 |
| 2245234 | 4/1975 | France | 403/342 |

Primary Examiner—Thomas B. Will
Assistant Examiner—Diego F. F. Gutierrez
Attorney, Agent, or Firm—Pollock, Vande Sande & Priddy

[57] ABSTRACT

A pyrometer has a lock nut that engages a threaded sighting tube. The lock nut encloses a ratchet mechanism formed by two coaxial collars with inclined ratchet teeth at their ends. The teeth are urged together by a helical spring, one of the collars being prevented from rotation relative to the nut by means of a pin that engages a slot in the collar. The other collar has an annular face which is urged by a disc spring against a washer locked with the body of the pyrometer so as to form a friction clutch. The ratchet allows the nut to be tightened but it can only be untightened by overcoming the friction of the clutch.

9 Claims, 2 Drawing Sheets

LOCKING MECHANISMS

BACKGROUND OF THE INVENTION

This invention relates to locking mechanisms.

The invention is more particularly concerned with locking mechanisms to prevent rotation of a rotatable nut, or similar component after it has been used to draw two parts into engagement with one another.

In many applications, such as on vehicles subject to vibration, it is important to be able to lock together two parts, such as mating parts of electrical connectors or the like. In one particular application, optical pyrometers are drawn into position in a sighting tube that extends into the combustion chamber of a gas-turbine engine by means of a screw-threaded nut. Once the nut has been tightened, it is locked in place by means of a length of wire. Although this arrangement is generally secure, it has several disadvantages. The use of wire can make removal and maintenance difficult when the engineer is wearing heavy gloves. Gloves are often needed, such as when the equipment is hot or when the engineer is working in hazardous or potentially hazardous environments. Wire can also puncture gloves, exposing the engineer to the hazardous environment.

BRIEF SUMMARY OF THE INVENTION

It is an object of the present invention to provide a locking mechanism that can be used to avoid these difficulties.

According to one aspect of the present invention there is provided a locking mechanism having a nut that is rotatable relative to a body, the nut and body having coupled therewith respective mating parts of a ratchet mechanism, and resilient means for urging the parts into engagement such that the two parts can be rotated relative to one another when the nut is rotated in a tightening sense, but are prevented from relative rotation when the nut is rotated in an untightening sense, one of the parts of the ratchet mechanism being coupled with its respective nut or body via a frictional clutch mechanism, the force required to overcome the clutch friction being greater than that needed to rotate the two parts of the ratchet mechanism relative to one another in a tightening sense, such that the force required to rotate the nut relative to the body in an untightening sense is greater than that required to rotate it in a tightening sense.

The mating parts of the ratchet mechanism are preferably coaxial collars that both have inclined ratchet teeth around one end, the resilient means urging the teeth into contact with one another. The frictional clutch mechanism may be provided by a surface of one of the collars and a surface fixed relative to the body. The surface of the collar may be an annular surface and the surface fixed relative to the body may be on an annular projection from the body. The mating parts of the ratchet mechanism are preferably located within the nut, and one of the mating parts may be prevented from rotation relative to the nut but be free for limited axial displacement. The one mating part and the nut preferably have an engaging pin and slot so that engagement of the pin in the slot prevents rotation of the one mating part in the nut but enables it to be displaced along the nut for a limited distance. The frictional clutch mechanism may include resilient means that urges the clutch mechanism together. The resilient means that urges the clutch together may include a disc spring.

According to another aspect of the present invention there is provided a pyrometer including a locking mechanism according to the above one aspect of the invention.

The nut may be coupled to a screw-threaded member that is engageable with a screw-threaded tube, the body being restrained from rotation relative to the tube such that after the locking mechanism has been tightened the pyrometer is retained in position relative to the screw-threaded tube unless the clutch friction is overcome.

A locking mechanism for a pyrometer, in accordance with the present invention will now be described, by way of example, with reference to the accompanying drawings.

Figure 1:
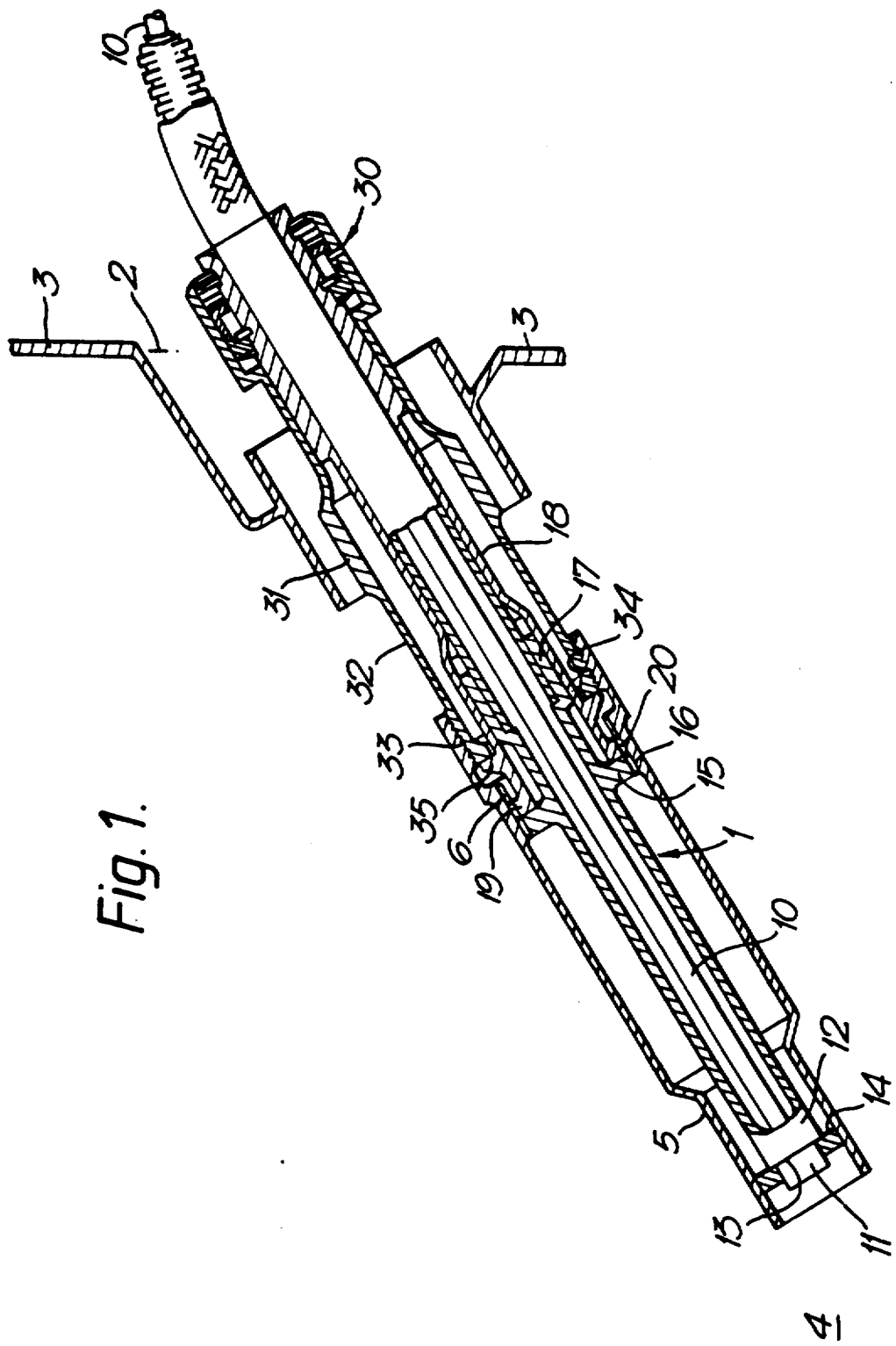
FIG. 1 is a partly cut-away side elevation view of the pyrometer.

The pyrometer 1 extends through an aperture 2 in the wall 3 of a gas-turbine engine combustion chamber 4 and projects within a sighting tube 5 that is directed at the region of the combustion chamber the temperature of which is to be monitored.

The pyrometer 1 has a fibre-optic cable 10 which extends along its length to the operative tip 11 of the pyrometer where a lens (not shown) is used to focus radiation from the combustion chamber 4 onto the cable. The cable 10 extends to a remote detector (not shown) which provides an electrical output, in the usual way, indicative of radiation level.

At its forward end, the pyrometer 1 has a cylindrical, temperature-resistant shell 12 which encases the cable 10. The forward end of the shell 12 has a step 13 which locates on a step 14 formed at the forward end of the sighting tube 5. Close to its rear end, the shell 12 has a radial flange 15 provided with axial splines 16 around its periphery which engage cooperating splines 6 on the inside of the rear end of the sighting tube 5. Rearwardly of the flange 15, the shell 12 is formed into a neck 17 which projects within the forward end of a rear sleeve or body 18. The forward end of the body 18 has a radially-projecting lip 19 which abuts the flange 15 on the shell 12 and which has splines 20 around its periphery which engage the splines 6 on the sighting tube. Alternative arrangements could be used to prevent rotation of the shell 12 in the sighting tube 5.

Figure 2:
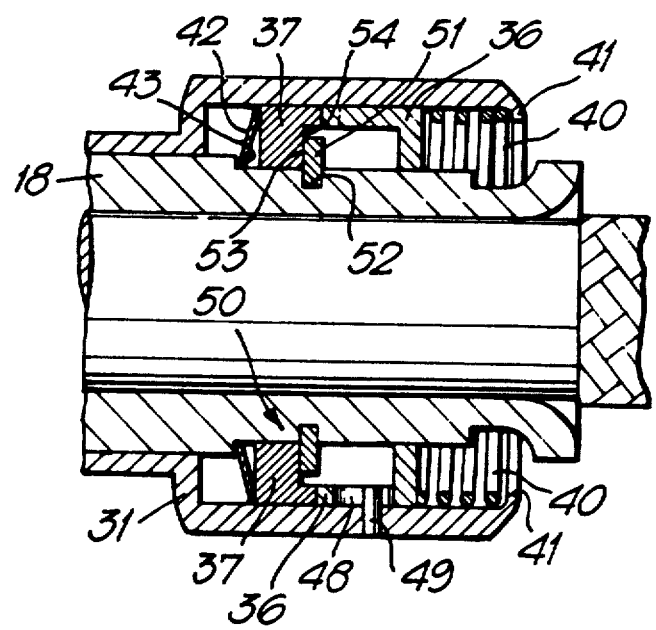
FIG. 2 is a sectional side elevation of a part of the pyrometer to a larger scale.
Figure 3:
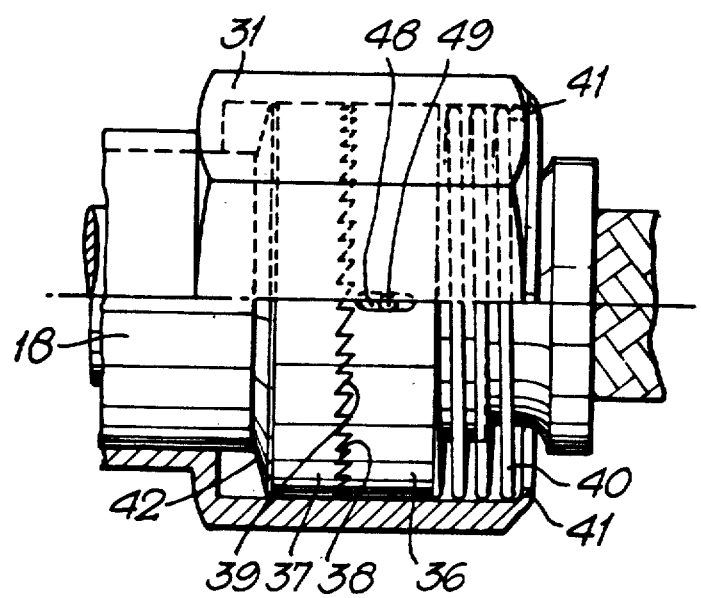
FIG. 3 is a partly sectional side elevation view of that part of the pyrometer in FIG. 2.

At its rear end, the body 18 supports a locking mechanism 30 enclosed within the rear end of a lock nut 31. The lock nut 31 takes the form of a cylindrical sleeve 32 which has a screw thread 33 around the outside of its forward end which engages a screw thread 34 on the inside of the rear end of the sighting tube 5. The forward end of the lock nut sleeve 32 abuts against a flange 35 close to the forward end of the body 18. At its rear end, the lock nut 31 contains a ratchet mechanism (FIG. 3) comprising two coaxial collars 36 and 37 formed with cooperating inclined ratchet teeth 38 and 39 around opposed, contacting edges. The two collars 36 and 37 are a loose fit within the lock nut 31, the rear one of the collars 36 having a short axial slot 48 into which extends a pin 49 that projects radially inwardly on the inside of the lock nut. More than one slot 48 and pin 49 could be used; alternative means could be used for permitting axial displacement of the collar 36 but preventing rotation relative to the lock nut 31. A helical spring 40 is also located within the locknut 31 to the rear of the collar 36. The forward end of the spring 40 bears on the rear face of the rear collar 36, whereas the rear end of the spring bears on an inturned lip 41 at the rear end of the locknut, so that a resilient force is applied to urge the rear collar 36 in a forward direction. The forward collar 37 is urged in a rearward direction by a disc spring 42 such as a Belleville washer. The outer edge of the spring 42 engages the forward face of the collar 37 whereas the inner edge of the spring engages a step 43 (FIG. 2) on the outside of the body 18.

The locking mechanism 30 also includes a frictional clutch mechanism 50 by which the forward collar 37 is coupled to the body 18. The clutch mechanism 50 includes an annular projection fixed relative to the body 18, such as a coaxial annular washer or circlip 51 which embraces a groove 52 around the outside of the body. The circlip 51 is restrained from rotation around the body 18 and its forward face 53 provides one surface of a clutch plate. The face 53 of the circlip 51 abuts a rear, annular face 54 on the forward collar 37 which provides the other clutch surface of the clutch mechanism 50. A high frictional force is exerted between the two clutch surfaces 53 and 54 by virtue of the resilient force exerted by the disc spring 42.

To install the pyrometer 1, its forward end is pushed through the aperture 2 into the sighting tube 5. The splines 16 on the shell 12 slide along the splines 6 in the sighting tube 5 to prevent rotation of the shell.

Similarly, the splines 20 on the body 18 prevent rotation of the body, when they engage with the splines 6 on the sighting tube. When the forward end of the lock nut 31 contacts the rear of the sighting tube 5, the lock nut is rotated to engage the two threads 33 and 34 and urge the pyrometer 1 further forwards into its locating position with the step 13 on the shell 12 abutting the step 14 on the sighting tube. The shape of the ratchet teeth 38 and 39 are such that the lock nut 31 can be rotated freely in a clockwise, tightening sense. As this happens, the rear ratchet collar 36 is displaced rearwardly against the resilience of the spring 40 each time that the teeth ride up over one another. It will be appreciated that the rear collar 36 will be rotated with the lock nut 31 because it is linked to it by the pin 49. The forward collar 37, however, will remain fixed relative to the body 18 because the frictional force of the clutch 50 is chosen to be greater than that of the ratchet mechanism 30.

When it is necessary to remove the pyrometer 1, the lock nut 31 is rotated in the opposite direction, that is, anticlockwise, in an untightening sense. The shape of the ratchet teeth 38 and 39 prevents any relative rotation between the two collars 36 and 37 in this sense. Rotation of the lock nut 31 relative to the body 18 in an untightening sense will only be possible if sufficient force is applied to overcome the friction of the clutch mechanism 50. When this happens, the forward and rear collars 36 and 37 both rotate with the locknut 31, the clutch surface 54 on the forward collar 37 rubbing over the clutch surface 53 on the circlip 51.

The force necessary to overcome the friction of the clutch 50 is a function of the resilience of the disc spring 42 and the nature of the two clutch surfaces 53 and 54. These are selected so that the lock nut 31 is effectively locked in its tightened state against vibration forces experienced in use of the pyrometer. This arrangement avoids the need to use wire to retain the locknut in position.

It will be appreciated that the invention is not restricted to use with pyrometers but could be used in other applications where a nut needs to be restrained from rotation about a body.

What I claim is:

1. A locking mechanism comprising: a first member in the form of a nut; a second member in the form of a body, the first member being rotatable relative to said second member; a ratchet mechanism having mating parts coupled with the first and second members respectively; a spring for urging said mating parts into engagement, the ratchet mechanism enabling said mating parts to be rotated relative to one another when the first member is rotated in a tightening sense, but preventing relative rotation when the first member is rotated in an untightening sense; and a frictional clutch mechanism, one of said mating parts of the ratchet mechanism being coupled with a respective one of said members via the frictional clutch mechanism, and the force required to overcome the clutch friction being greater than that needed to rotate the two parts of the ratchet mechanism relative to one another in a tightening sense, such that the force required to rotate the first member relative to the second member in an untightening sense is greater than that required to rotate it in a tightening sense.

2. A locking mechanism according to claim 1, wherein the mating parts of the ratchet mechanism are provided by two coaxial collars, wherein both the collars have inclined ratchet teeth around one end, and wherein the spring urges the teeth into contact with one another.

3. A locking mechanism according to claim 2, wherein the frictional clutch mechanism is provided by a surface of one of the collars and a surface of a projection fixed relative to the second member.

4. A locking mechanism according to claim 3, wherein said surface of the collar is an annular surface, and wherein the surface fixed relative to the second member is of annular shape.

5. A locking mechanism according to claim 1, wherein the mating parts of the ratchet mechanism are located within the first member.

6. A locking mechanism according to claim 5, including means which prevents one of the mating parts from rotation relative to the first member but allows limited axial displacement.

7. A locking mechanism according to claim 6, wherein the means preventing rotation comprises a mating pin and slot, so that engagement of the pin in the slot prevents rotation of the said one part in the first member but enables it to be displaced along the first member for a limited distance.

8. A locking mechanism according to claim 1, wherein the frictional clutch mechanism includes a further spring that urges the clutch mechanism together.

9. A locking mechanism according to claim 8, wherein the further spring is a disc spring.

* * * * *